US010630165B2

United States Patent
Smolenski et al.

(10) Patent No.: US 10,630,165 B2
(45) Date of Patent: Apr. 21, 2020

(54) SYSTEMS AND METHODS FOR SYNCHRONOUS POWER CONVERSION

(71) Applicant: General Electric Company, Schenectady, NY (US)

(72) Inventors: Joseph Lucian Smolenski, Slingerlands, NY (US); Danijel Maricic, Niskayuna, NY (US); Jinhui Zhang, Dayton, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/699,363

(22) Filed: Sep. 8, 2017

(65) Prior Publication Data

US 2019/0081550 A1 Mar. 14, 2019

(51) Int. Cl.
*H02M 1/38* (2007.01)
*H02M 1/32* (2007.01)
(Continued)

(52) U.S. Cl.
CPC ............ *H02M 1/32* (2013.01); *H02M 1/38* (2013.01); *H02M 7/2173* (2013.01);
(Continued)

(58) Field of Classification Search
CPC .......... H02M 7/42; H02M 7/48; H02M 7/487; H02M 7/493; H02M 7/501; H02M 7/4826; H02M 7/49; H02M 7/4807; H02M 7/537; H02M 7/5387; H02M 7/533; H02M 7/53; H02M 2007/4803; H02M 2007/4822; H02M 1/12; H02M 1/42; H02M 1/4225; H02M 1/4233; H02M 1/4241; H02M 1/4258; H02M 1/425; H02M 1/42;
(Continued)

(56) References Cited

U.S. PATENT DOCUMENTS 6,107,844 A * 8/2000 Berg .................. H02M 7/5387
327/110
7,391,194 B2 6/2008 Brown
(Continued)

FOREIGN PATENT DOCUMENTS

WO 2016133505 A1 8/2016

OTHER PUBLICATIONS

Bajec et al., "Extending the low-speed operation range of PM Generator in automotive applications using novel AC-DC converter control", IEEE Transactions on Industrial Electronics, vol. 52, Issue: 2, pp. 436-443, Apr. 2005.

*Primary Examiner* — Bryan R Perez
(74) *Attorney, Agent, or Firm* — Armstrong Teasdale LLP (57) ABSTRACT

A power converter is provided. The power converter includes a first phase including a first upper diode and a first lower diode, a second phase including a second upper diode and a second lower diode, a third phase including a third upper diode and a third lower diode, a plurality of MOSFETs, each of the first upper diode, the first lower diode, the second upper diode, the second lower diode, the third upper diode, and the third lower diode electrically connected in parallel with a respective one of the plurality of MOSFETs, and a control system configured to selectively activate each MOSFET when current flows through a diode electrically coupled in parallel with that MOSFET.

20 Claims, 4 Drawing Sheets

(51) Int. Cl.
*H02M 7/217* (2006.01)
*H02M 7/5387* (2007.01)
*H02M 7/797* (2006.01)
*H02M 1/00* (2006.01)
*H02M 7/219* (2006.01)

(52) U.S. Cl.
CPC ......... *H02M 7/5387* (2013.01); *H02M 7/797* (2013.01); *H02M 2001/0009* (2013.01); *H02M 2001/0012* (2013.01); *H02M 2001/0048* (2013.01); *H02M 2001/0051* (2013.01); *H02M 2007/2195* (2013.01)

(58) Field of Classification Search
CPC . H02M 2001/4283; H02M 2001/4291; H02M 2003/1552; H02M 5/40; H02M 5/42; H02M 5/44; H02M 5/443; H02M 5/45; H02M 5/4505; H02M 5/451; H02M 5/452; H02M 5/458; H02M 5/4585; G05F 1/70; H02J 3/16
USPC ............. 363/34–37, 44–48, 51–53, 125–128
See application file for complete search history.

(56) References Cited

U.S. PATENT DOCUMENTS

| | | |
|---|---|---|
| 8,072,204 B1 | 12/2011 | Heineman et al. |
| 8,325,497 B2 | 12/2012 | Marotta et al. |
| 9,293,999 B1 | 3/2016 | Lam et al. |
| 9,362,844 B2 | 6/2016 | Nguyen |
| 9,391,530 B2 | 7/2016 | Fang et al. |
| 2011/0280049 A1* | 11/2011 | Mori .................. H02M 1/4216 363/25 |
| 2012/0047386 A1* | 2/2012 | Matsui ................ H01M 10/465 713/340 |
| 2012/0218801 A1* | 8/2012 | Yamanaka ........ H02M 7/53875 363/148 |
| 2013/0002227 A1* | 1/2013 | Ikeda .................. H02M 7/5387 323/311 |
| 2013/0155740 A1* | 6/2013 | Takubo ............. H02M 7/53875 363/98 |
| 2013/0307461 A1* | 11/2013 | Mehringer ........... H02M 7/219 318/722 |
| 2014/0036553 A1* | 2/2014 | Permuy .................. H02H 7/06 363/34 |
| 2016/0218627 A1 | 7/2016 | Dikken et al. |
| 2016/0261191 A1 | 9/2016 | Akram et al. |

* cited by examiner

SYSTEMS AND METHODS FOR SYNCHRONOUS POWER CONVERSION

BACKGROUND

The field of the invention relates generally to power conversion, and more specifically, to methods and systems for controlling power conversion systems to reduce losses.

At least some known power conversion systems convert three-phase alternating current (AC) power into direct current (DC) power. This may be accomplished, for example, using a synchronous rectifier that includes three pairs of diodes (i.e., one pair for each of the three phases). The pairs of diodes rectify the three phase currents to generate a DC current output. In at least some known synchronous rectifiers, relatively complicated controls are implemented to control current flow through the diodes and additional electronic components. Further, at least some known synchronous rectifier control schemes are prone to generating cross-conduction, which may impair operation of and/or damage power conversion equipment.

BRIEF DESCRIPTION

In one aspect, a power converter is provided. The power converter includes a first phase including a first upper diode and a first lower diode, a second phase including a second upper diode and a second lower diode, a third phase including a third upper diode and a third lower diode, a plurality of MOSFETs, each of the first upper diode, the first lower diode, the second upper diode, the second lower diode, the third upper diode, and the third lower diode electrically connected in parallel with a respective one of the plurality of MOSFETs, and a control system configured to selectively activate each MOSFET when current flows through a diode electrically coupled in parallel with that MOSFET.

In a further aspect, a power conversion system is provided. The power conversion system includes a machine, a direct current (DC) electrical grid, and a power converter coupled between the machine and the DC electrical grid, the power converter configured to convert alternating current (AC) power received from the machine into DC power for supplying to the DC electrical grid. The power converter includes a first phase including a first upper diode and a first lower diode, a second phase including a second upper diode and a second lower diode, a third phase including a third upper diode and a third lower diode, a plurality of MOSFETs, each of the first upper diode, the first lower diode, the second upper diode, the second lower diode, the third upper diode, and the third lower diode electrically connected in parallel with a respective one of the plurality of MOSFETs, and a control system configured to selectively activate each MOSFET when current flows through a diode electrically coupled in parallel with that MOSFET.

In another aspect, a method is provided for operating a power converter including a first phase having a first upper diode and a first lower diode, a second phase having a second upper diode and a second lower diode, a third phase having a third upper diode and a third lower diode, and a plurality of MOSFETs, each of the first upper diode, the first lower diode, the second upper diode, the second lower diode, the third upper diode, and the third lower diode electrically connected in parallel with a respective one of the plurality of MOSFETs. The method includes receiving, at a control system, a first current measurement indicative of a current flowing through the first phase, comparing, using the control system, the first current measurement to a positive threshold current and a negative threshold current, activating, using the control system, the MOSFET electrically connected in parallel with the first upper diode when the first current measurement is greater than the positive threshold current, deactivating, using the control system, the MOSFET electrically connected in parallel with the first upper diode when the first current measurement is less than the positive threshold current, activating, using the control system, the MOSFET electrically connected in parallel with the first lower diode when the first current measurement is less than the negative threshold current, and deactivating, using the control system, the MOSFET electrically connected in parallel with the first lower diode when the first current measurement is greater than the negative threshold current.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), a programmable logic unit (PLU), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and methods described herein provide a power converter including a plurality of diodes electrically connected in parallel with associated MOSFETs. A control system compares currents flowing through the diodes with positive and negative threshold currents. When a current through a particular diode exceeds the positive or negative threshold current, the control system activates the MOSFET associated with that diode. This facilitates reducing power losses in the power converter.

Figure 1:
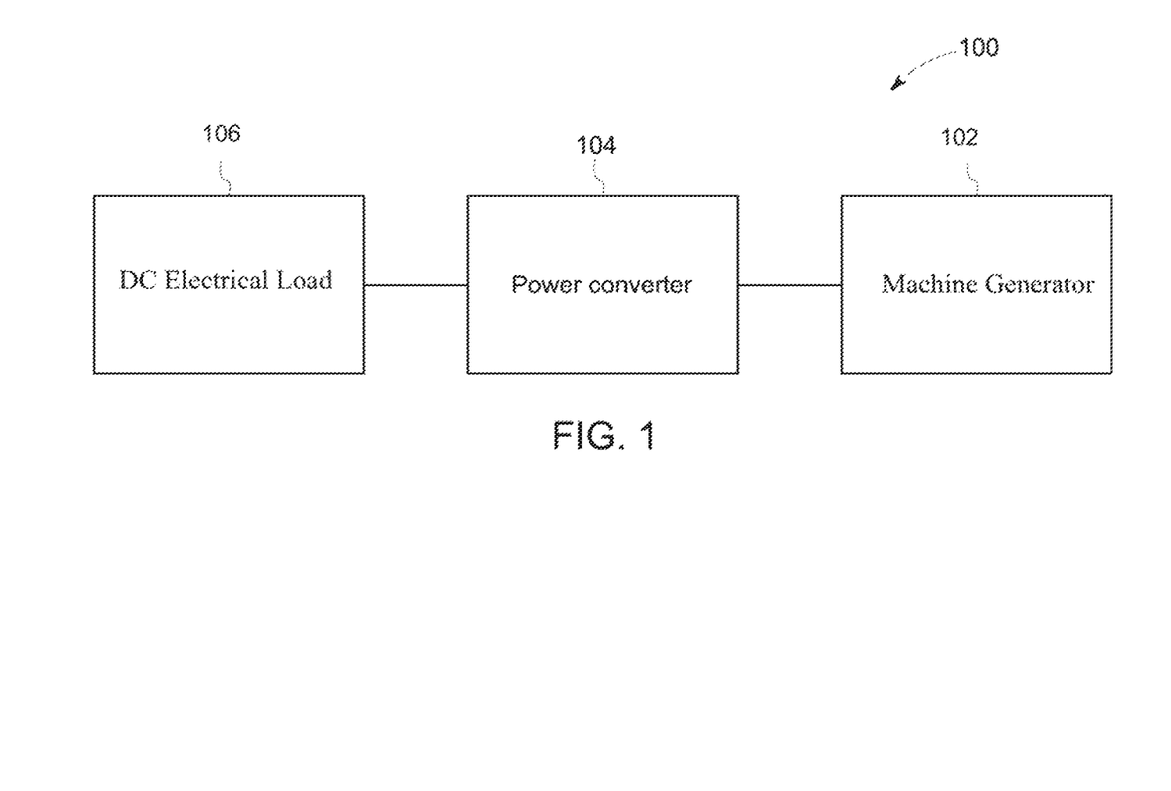
FIG. 1 is a block diagram of an exemplary power conversion system.

FIG. 1 is a block diagram of an exemplary power conversion system 100. System 100 includes a machine 102, a power converter 104, and a direct current (DC) electrical grid 106. Machine 102 is electrically coupled to power converter 104, which is in turn electrically coupled to DC electrical grid 106. Power conversion system 100 may be used, for example, with silicon carbide transistors and/or other high-temperature transistors. Machine 102 may be, for example a synchronous machine generator or an asynchronous machine generator (e.g., a three phase induction machine generator).

System 100 is capable of operating in a both a motoring mode and a generating mode. In the motoring mode, in embodiments where machine 102 is a doubly fed induction machine, three-phase alternating current (AC) electrical power output by machine 102 is controlled by varying an exciter field within machine 102. Alternatively, machine 102 may be other types of machines. For example, in some embodiments, machine 102 is a permanent-magnet synchronous motor (PMSM) machine. In the motoring mode, DC electrical grid 106 provides DC electrical power to power converter 104, power converter 104 converts the DC electrical power into AC electrical power, and power converter 104 supplies the AC electrical power to machine 102. In the generating mode, machine 102 converts mechanical power into three-phase AC electrical power. Power converter 104 subsequently converts the three-phase AC electrical power into DC electrical power at a DC bus voltage, $V_{DC}$. The DC bus voltage may be, for example, 270 Volts. The DC electrical power is then supplied to DC electrical grid 106.

Figure 2:
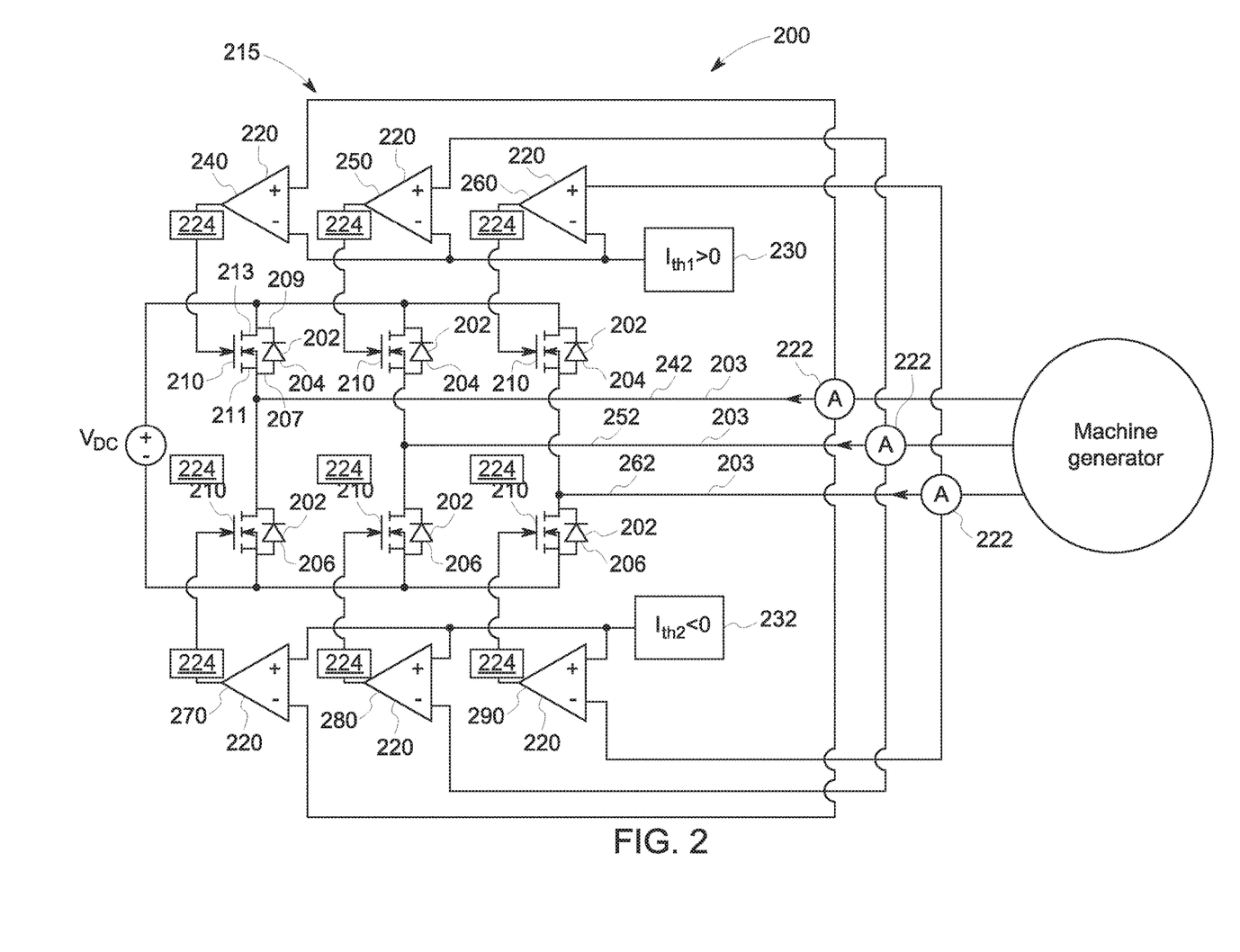
FIG. 2 is a schematic diagram of one embodiment of a power converter that may be used with the system shown in FIG. 1.
Figure 3:
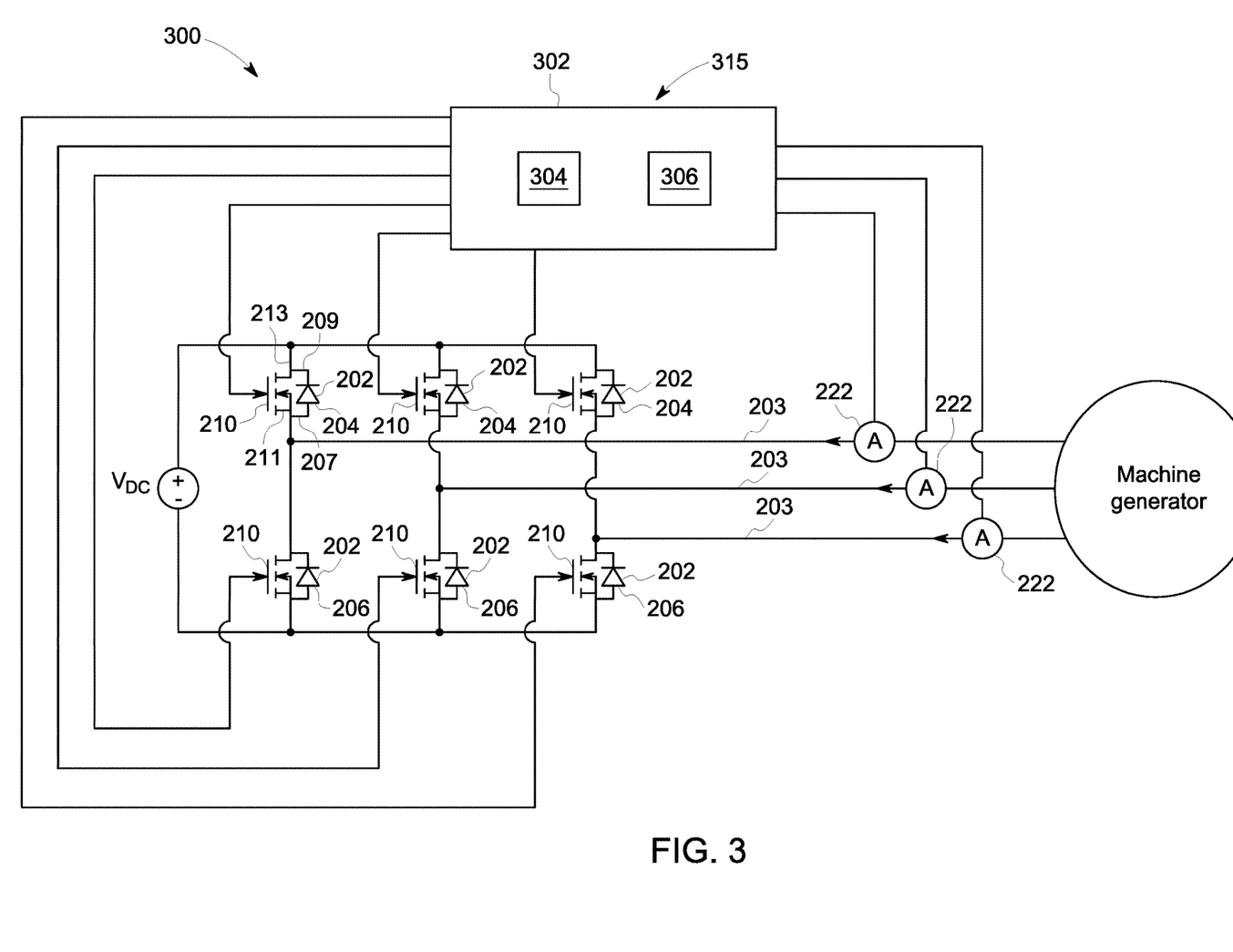
FIG. 3 is a schematic diagram of another embodiment of a power converter that may be used with the system shown in FIG. 1.

FIG. 2 is a schematic diagram of one embodiment of a power converter 200 that may be used with system 100 (shown in FIG. 1). FIG. 3 is a schematic diagram of another embodiment of a power converter 300 that may be used with system. That is, power converter 104 (shown in FIG. 1) may be implemented using power converter 200 or power converter 300.

In the exemplary embodiment, power converters 200 and 300 are three-phase bi-directional power converters. Further, as shown in FIGS. 2 and 3, each power converter 200 and 300 includes six diodes 202. Specifically, for each phase 203 of the three phases, power converters 200 and 300 include an upper diode 204 and a lower diode 206. Diodes 202 may be, for example, silicon carbide Schottky diodes, silicon diodes, silicon Schottky diodes, etc. Alternatively, diodes 202 may be any particular diodes that enable power converters 200 and 300 to function as described herein.

A metal-oxide-semiconductor field-effect-transistor (MOSFET) 210 is electrically connected in parallel with each diode 202. Specifically, an anode 207 of each diode 202 is electrically coupled to a source 211 of an associated MOSFET 210, and a cathode 209 of each diode 202 is electrically coupled to a drain 213 of the associated MOSFET 210. MOSFETS 210 may be, for example, silicon carbide MOSFETs, gallium nitride MOSFETs, silicon MOSFETs, etc. Alternatively, MOSFETS 210 may be any particular MOSFETS that enable power converters 200 and 300 to function as described herein.

In the embodiments described herein, when system 100 is operated in the motoring mode, each MOSFET 210 is selectively turned activated (i.e., such that MOSFET 210 conducts current) depending on the direction and level of current through the associated diode 202. Specifically, in the control scheme described herein, each MOSFET 210 is only activated when the associated diode 202 is conducting current. This control scheme results in reduced power losses, as compared to a passive rectification converter architecture that only includes diodes, without associated MOSFETs. Specifically, reduced power losses are realized in the embodiments described herein because current is shared between a diode 202 and the associated MOSFET 210, which functions as a relatively small resistor in parallel with the associated diode 202.

This control scheme may be accomplished using any suitable control architecture. For example, for power converter 200 (shown in FIG. 2), a control system 215 is realized using a plurality of comparators 220. In the exemplary embodiment, power converter 200 includes three current sensors 222, each current sensor measuring the current for a respective phase 203 of power being supplied from machine 102 to power converter 200. Alternatively, in some embodiments, power converter 200 includes only two current sensors 222, and the current for the third phase is calculated as i3=−(i1+i2). Each comparator 220 compares a measured current (from one of current sensors 222) to one of a positive threshold current 230, $I_{th1}$, and a negative threshold current 232, $I_{th2}$. If the measured current exceeds the threshold current (i.e., if a positive measured current is greater than positive threshold current 230, or if a negative measured current is less than negative threshold current 232), the comparator activates an associated MOSFET 210.

Specifically, in the exemplary embodiment, a first comparator 240 compares a measured current for a first phase 242 to positive threshold current 230. If the measured current exceeds positive threshold current 230, first comparator 240 activates a MOSFET 210 connected in parallel with upper diode 204 for first phase 242. Similarly, a second comparator 250 compares a measured current for a second phase 252 to positive threshold current 230, and, if the measured current exceeds positive threshold current 230, second comparator 250 activates a MOSFET 210 connected in parallel with upper diode 204 for second phase 252. Further, a third comparator 260 compares a measured current for a third phase 262 to positive threshold current 230, and, if the measured current exceeds positive threshold current 230, third comparator 260 activates a MOSFET 210 connected in parallel with upper diode 204 for third phase 262.

Similarly, in the exemplary embodiment, a fourth comparator 270 compares a measured current for first phase 242 to negative threshold current 232, and, if the measured current exceeds (i.e., is less than) negative threshold current 232, fourth comparator 270 activates a MOSFET 210 connected in parallel with lower diode 206 for first phase 242. Further, a fifth comparator 280 compares a measured current for second phase 252 to negative threshold current 232, and, if the measured current exceeds negative threshold current 232, fifth comparator 280 activates a MOSFET 210 connected in parallel with lower diode 206 for second phase 252. In addition, a sixth comparator 290 compares a measured current for third phase 262 to negative threshold current 232, and, if the measured current exceeds negative threshold current 232, sixth comparator 290 activates a MOSFET 210 connected in parallel with lower diode 206 for third phase 262. When the measured current no longer exceeds the associated threshold current 230, 232, comparator 220 deactivates the associated MOSFET 210.

Positive and negative threshold currents 230 and 232 may be, for example, 10% of an expected current flow through diodes 202. For example, in some embodiments the positive and negative threshold currents 230 and 232 may have a magnitude in a range of approximately twenty to thirty amps. Alternatively, positive and negative threshold currents 230 and 232 may be any value that enables power converters 200 and 300 to function as described herein. Further, in some embodiments, positive and negative threshold currents 230 are adjustable to facilitate modifying operation of power converters 200 and 300.

In some embodiments, a delay circuit 224 is electrically coupled between each comparator 220 and associated MOSFET 210. Delay circuit 224 increases the time it takes for a particular comparator 220 to activate an associated MOSFET 210. This facilitates preventing cross-conduction. More specifically, if both MOSFETs 210 for a given phase 203 are activated at the same time, cross-conduction will occur, which may result in improper operation of and damage to power converters 200 and 300. Accordingly, delaying the activation of MOSFETs 210 facilitates preventing cross-conduction. Delay circuits 224 may delay activation, for example, by approximately 1 microsecond (µs). Alternatively, delays circuits 224 may delay activation by any length of time that enables system 100 to function as described herein.

Unless otherwise indicated, power converter 300 (shown in FIG. 3) includes the same components as power converter 200, and operates substantially similar to power converter 300. Instead of using comparators 220, power converter 300 includes a control system 315 having a controller 302 that controls selective activation of MOSFETs 210. Although a single controller 302 is shown in FIG. 3, alternatively, a separate controller may control the operation of each MOSFET 210. In some embodiments, controller 302 is coupled to a substitute controller (not shown) that may be used in the event that controller 302 fails.

In the exemplary embodiment, controller 302 is implemented by a processor 304 communicatively coupled to a memory device 306 for executing instructions. In some embodiments, executable instructions are stored in memory device 306. Alternatively, controller 302 may be implemented using any circuitry that enables controller 302 to function as described herein.

In the exemplary embodiment, controller 302 performs one or more operations described herein by programming processor 304. For example, processor 304 may be programmed by encoding an operation as one or more executable instructions and by providing the executable instructions in memory device 306. Processor 304 may include one or more processing units (e.g., in a multi-core configuration). Further, processor 304 may be implemented using one or more heterogeneous processor systems in which a main processor is present with secondary processors on a single chip. As another illustrative example, processor 304 may be a symmetric multi-processor system containing multiple processors of the same type. Further, processor 304 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 304 causes controller 302 to selectively activate MOSFETs 210, as described herein.

In the exemplary embodiment, memory device 306 is one or more devices that enable information such as executable instructions and/or other data to be stored and retrieved. Memory device 306 may include one or more computer readable media, such as, without limitation, dynamic random access memory (DRAM), static random access memory (SRAM), a solid state disk, and/or a hard disk. Memory device 306 may be configured to store, without limitation, application source code, application object code, source code portions of interest, object code portions of interest, configuration data, execution events and/or any other type of data.

In the exemplary embodiment, controller 302 performs similar functionality to comparators 220 (shown in FIG. 2). Specifically, for each MOSFET 210, controller 302 compares a measured current (from one of current sensors 222) to one of positive threshold current 230 and negative threshold current 232, as appropriate. If the measured current exceeds the threshold current, controller 302 activates the associated MOSFET 210. Further, in some embodiments, controller 302 delays activation of MOSFETs 210 to facilitate preventing cross-conduction, as described above.

Figure 4:
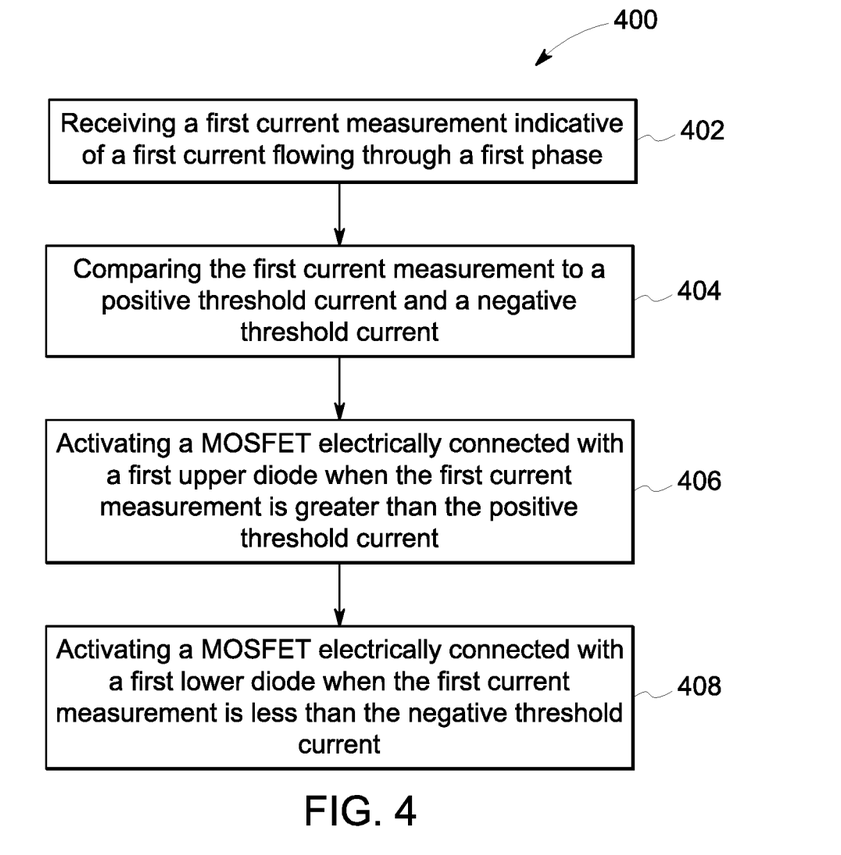
FIG. 4 is a flow diagram of an exemplary method for operating a power converter.

FIG. 4 is a flow diagram of an exemplary method 400 for operating a power converter, such as power converter 200 (shown in FIG. 2) and power converter 300 (shown in FIG. 3). The power converter includes a first phase having a first upper diode and a first lower diode, a second phase having a second upper diode and a second lower diode, a third phase having a third upper diode and a third lower diode, and a plurality of MOSFETs, each MOSFET of the plurality of MOSFETs electrically connected in parallel with one of the first upper diode, the first lower diode, the second upper diode, the second lower diode, the third upper diode, and the third lower diode.

Method 400 includes receiving 402, at a control system (such as control system 215 or control system 315), a first current measurement indicative of a current flowing through the first phase. Method 400 further includes comparing 404, using the control system, the first current measurement to a positive threshold current and a negative threshold current. Method 400 further includes activating 406, using the control system, the MOSFET electrically connected in parallel with the first upper diode when the first current measurement is greater than the positive threshold current. Method 400 further includes activating 408, using the control system, the MOSFET electrically connected in parallel with the first lower diode when the first current measurement is less than the negative threshold current. Those of skill in the art will appreciate that similar receiving, comparing, and activating steps may be carried out for the second and third phases as well.

The above-described systems and methods provide a power converter including a plurality of diodes electrically connected in parallel with associated MOSFETs. A control system compares currents flowing through the diodes with positive and negative threshold currents. When a current through a particular diode exceeds the positive or negative threshold current, the control system activates the MOSFET associated with that diode. This facilitates reducing power losses in the power converter.

An exemplary technical effect of the methods, systems, and apparatus described herein includes at least one of: (a) reducing power losses in synchronous power conversion systems; (b) simplifying control schemes synchronous power conversion systems and (c) avoiding cross-conduction in synchronous power conversion systems.

Exemplary embodiments of method and systems for synchronous power conversion are described above in detail. The method and systems described herein are not limited to the specific embodiments described herein, but rather, components of systems or steps of the methods may be utilized independently and separately from other components or steps described herein. For example, the methods may also be used in combination with multiple different gas lift system, and are not limited to practice with only the gas lift systems as described herein. Additionally, the methods may also be used with other fluid sources, and are not limited to practice with only the fluid sources as described herein. Rather, the exemplary embodiments may be implemented and utilized in connection with many other gas lift devices to be operated as described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power converter comprising:
a first phase comprising a first upper diode and a first lower diode; a second phase comprising a second upper diode and a second lower diode; a third phase comprising a third upper diode and a third lower diode; a plurality of MOSFETs, each of said first upper diode, said first lower diode, said second upper diode, said second lower diode, said third upper diode, and said third lower diode electrically connected in parallel with a respective one of said plurality of MOSFETs; at least one delay circuit electrically connected to each MOSFET of said plurality of MOSFETs; and a control system configured to selectively activate each MOSFET when current flows through a diode electrically coupled in parallel with that MOSFET; wherein said power converter is configured to i) receive alternating current (AC) power from a machine and ii) output direct current (DC) power to a DC electrical grid; wherein said control system is configured to: compare a first current flowing through said first phase with a positive threshold current; activate, after a delay by said at least one delay circuit and further in response to the comparison, a first MOSFET electrically coupled in parallel with said first upper diode when the first current is greater than the positive threshold current; and
deactivate the first MOSFET electrically coupled in parallel with said first upper diode when the first current is less than the positive threshold current.

2. The power converter in accordance with claim 1, wherein said control system is configured to: compare a first current flowing through said first phase with a negative threshold current;
activate a second MOSFET electrically coupled in parallel with said first lower diode when the first current is less than the negative threshold current; and
deactivate the second MOSFET electrically coupled in parallel with said first lower diode when the first current is greater than the negative threshold current.

3. The power converter in accordance with claim 1, wherein said control system comprises a controller comprising a processor and a memory device.

4. The power converter in accordance with claim 1, wherein said control system comprises a plurality of comparators.

5. The power converter in accordance with claim 1, wherein said control system is configured to delay selective activation of each MOSFET, using said at least one delay circuit, to facilitate preventing cross-conduction.

6. The power converter in accordance with claim 1, further comprising:
a first current sensor configured to measure current flowing through said first phase; and
a second current sensor configured to measure current flowing through said second phase.

7. The power converter in accordance with claim 6, wherein said control system is configured to receive current measurements from said first and second current sensors.

8. The power converter of claim 1, wherein the delay created by said at least one delay circuit is 1 microsecond.

9. A power conversion system comprising: a machine; a direct current (DC) electrical grid; and a power converter coupled between said machine and said DC electrical grid, said power converter configured to convert alternating current (AC) power received from said machine into DC power for supplying to said DC electrical grid, said power converter comprising: a first phase comprising a first upper diode and a first lower diode; a second phase comprising a second upper diode and a second lower diode; a third phase comprising a third upper diode and a third lower diode; a plurality of MOSFETs, each of said first upper diode, said first lower diode, said second upper diode, said second lower diode, said third upper diode, and said third lower diode electrically connected in parallel with a respective one of said plurality of MOSFETs; at least one delay circuit electrically connected to each MOSFET of said plurality of MOSFETs; and a control system configured to selectively activate each MOSFET when current flows through a diode electrically coupled in parallel with that MOSFET; wherein said control system is configured to: compare a first current flowing through said first phase with a negative threshold current; activate, after a delay by said at least one delay circuit and further in response to the comparison, a first MOSFET electrically coupled in parallel with said first lower diode when the first current is less than the negative threshold current; and
deactivate the first MOSFET electrically coupled in parallel with said first lower diode when the first current is greater than the negative threshold current.

10. The power conversion system in accordance with claim 9, wherein said control system is configured to: compare a first current flowing through said first phase with a positive threshold current;
activate a second MOSFET electrically coupled in parallel with said first upper diode when the first current is greater than the positive threshold current; and
deactivate the second MOSFET electrically coupled in parallel with said first upper diode when the first current is less than the positive threshold current.

11. The power conversion system in accordance with claim 9, wherein said control system comprises a controller comprising a processor and a memory device.

12. The power conversion system in accordance with claim 9, wherein said control system comprises a plurality of comparators.

13. The power conversion system in accordance with claim 9, wherein said control system is configured to delay, using said at least one delay circuit, selective activation of each MOSFET of the plurality of MOSFETS to facilitate preventing cross-conduction.

14. The power conversion system in accordance with claim 9, further comprising:
a first current sensor configured to measure current flowing through said first phase; and
a second current sensor configured to measure current flowing through said second phase.

15. The power conversion system in accordance with claim 14, wherein said control system is configured to receive current measurements from said first and second current sensors.

16. A method of operating a power converter including a first phase having a first upper diode and a first lower diode, a second phase having a second upper diode and a second lower diode, a third phase having a third upper diode and a third lower diode, and a plurality of MOSFETs, each of the first upper diode, the first lower diode, the second upper diode, the second lower diode, the third upper diode, and the third lower diode electrically connected in parallel with a respective one of the plurality of MOSFETs, said method comprising: receiving, at the power converter, alternating current (AC) power from a machine; converting, using the power converter, the AC power into direct current (DC) power; supplying the DC power to a DC electrical grid; receiving, at a control system, a first current measurement indicative of a current flowing through the first phase; comparing, using the control system, the first current measurement to a positive threshold current and a negative threshold current;
activating, using the control system
and after a delay by a first delay circuit and further in response to the comparing, a first MOSFET electrically connected in parallel with the first upper diode when the first current measurement is greater than the positive threshold current;
deactivating, using the control system, the first MOSFET electrically connected in parallel with the first upper diode when the first current measurement is less than the positive threshold current;
activating, using the control system and after a delay by a second delay circuit and further in response to the comparing, a second MOSFET electrically connected in parallel with the first lower diode when the first current measurement is less than the negative threshold current; and deactivating, using the control system, the second MOSFET electrically connected in parallel with the first lower diode when the first current measurement is greater than the negative threshold current.

17. The method of claim 16, further comprising:

measuring, by a first current sensor, the first current measurement equal to current flowing through the first phase; and measuring, by a second current sensor, a second current measurement equal to current flowing through the second phase.

18. The method of claim 17, further comprising: computing, by the control system, a third current measurement for the third phase based on the first current measurement and the second current measurement; comparing, using the control system, the third current measurement to the positive threshold current and the negative threshold current;

activating, using the control system and after a delay by a third delay circuit and further in response to the comparing, a third MOSFET electrically connected in parallel with the third upper diode when the third current measurement is greater than the positive threshold current;

deactivating, using the control system, the third MOSFET electrically connected in parallel with the third upper diode when the third current measurement is less than the positive threshold current;

activating, using the control system and after a delay by a fourth delay circuit and further in response to the comparing, a fourth MOSFET electrically connected in parallel with the third lower diode when the third current measurement is less than the negative threshold current; and deactivating, using the control system, the fourth MOSFET electrically connected in parallel with the third lower diode when the third current measurement is greater than the negative threshold current.

19. The method in accordance with claim 16, further comprising delaying activation of the first MOSFET electrically connected in parallel with the first upper diode to facilitate preventing cross-conduction.

20. The method of claim 16, further comprising delaying, using a plurality of delay circuits including the first delay circuit and the second delay circuit, in response to the comparing, selective activating of each MOSFET of the plurality of MOSFETs to facilitate preventing cross-conduction.

* * * * *